(12) United States Patent
Batu et al.

(10) Patent No.: US 11,147,212 B2
(45) Date of Patent: Oct. 19, 2021

(54) BELTING WITH LONGITUDINAL COGS

(71) Applicant: WCCO Belting, Inc., Wahpeton, ND (US)

(72) Inventors: Neri Prestes Batu, Wahpeton, ND (US); Chad R. Haugen, Wahpeton, ND (US)

(73) Assignee: WCCO Belting, Inc., Wahpeton, ND (US)

( * ) Notice: Subject to any disclaimer, the term of this patent is extended or adjusted under 35 U.S.C. 154(b) by 287 days.

(21) Appl. No.: 16/394,386

(22) Filed: Apr. 25, 2019

(65) Prior Publication Data

US 2019/0350133 A1 Nov. 21, 2019

Related U.S. Application Data

(60) Provisional application No. 62/672,846, filed on May 17, 2018.

(51) Int. Cl.
| | | |
|---|---|---|
| *A01D 61/02* | (2006.01) | |
| *B65G 15/42* | (2006.01) | |
| *A01D 61/00* | (2006.01) | |
| *A01D 57/20* | (2006.01) | |

(52) U.S. Cl.
CPC .......... *A01D 61/02* (2013.01); *A01D 61/002* (2013.01); *B65G 15/42* (2013.01); *A01D 57/20* (2013.01)

(58) Field of Classification Search
CPC ...... A01D 61/02; A01D 61/002; A01D 57/20; B65G 15/42; B65G 15/46
See application file for complete search history.

(56) References Cited

U.S. PATENT DOCUMENTS

| | | | | |
|---|---|---|---|---|
| 344,563 | A * | 6/1886 | Channell | B65G 15/32 198/821 |
| 1,484,248 | A * | 2/1924 | Austin | B65G 15/34 198/847 |
| 3,129,806 | A * | 4/1964 | Stiltner | B29K 2021/00 198/821 |
| 4,109,784 | A * | 8/1978 | Hartmann | B65G 15/42 198/821 |
| 4,509,938 | A | 4/1985 | Woodland | |
| 4,702,729 | A | 10/1987 | Tanaka | |
| 4,863,419 | A * | 9/1989 | Sansone | B65G 15/42 474/237 |
| D333,544 | S * | 2/1993 | Uehara | D34/29 |
| 5,459,986 | A | 10/1995 | Talbot | |
| 6,571,935 | B1 * | 6/2003 | Campbell | B65G 15/42 198/690.2 |

(Continued)

OTHER PUBLICATIONS

International Preliminary Report on Patentability received for PCT Serial No. PCT/US2019/029089 dated Nov. 26, 2020, 11 pgs.

(Continued)

*Primary Examiner* — Arpad Fabian-Kovacs
(74) *Attorney, Agent, or Firm* — Michael A. Bondi; Moss & Barnett

(57) ABSTRACT

Belting with longitudinal cogs that includes belting and at least two longitudinal cogs. The belting has an upper surface, a lower surface and a first edge. The at least two longitudinal cogs are attached to the upper surface of the belting proximate the first edge. Each of the longitudinal cogs is substantially parallel to the first edge. A channel is defined between the at least two longitudinal cogs.

26 Claims, 2 Drawing Sheets

(56) References Cited

U.S. PATENT DOCUMENTS

| | | | |
|---|---|---|---|
| 7,472,533 B2 | 1/2009 | Talbot | |
| 7,908,836 B1 | 3/2011 | Rayfield | |
| 8,291,686 B1* | 10/2012 | Cormier | A01D 61/002 |
| | | | 56/181 |
| 8,769,919 B2 | 7/2014 | Cormier et al. | |
| 9,591,802 B2 | 3/2017 | Allochis | |
| 9,635,810 B2 | 5/2017 | Leys et al. | |
| 9,795,086 B2* | 10/2017 | Hasenour | A01D 41/14 |
| 2006/0081516 A1* | 4/2006 | Hendrickson | B07B 15/00 |
| | | | 209/707 |
| 2008/0092508 A1* | 4/2008 | Talbot | A01D 57/20 |
| | | | 56/181 |
| 2008/0276591 A1* | 11/2008 | Tippery | B65G 15/42 |
| | | | 56/181 |
| 2011/0094201 A1* | 4/2011 | Bomleny | A01D 61/02 |
| | | | 56/181 |
| 2012/0233974 A1* | 9/2012 | Cormier | A01D 61/006 |
| | | | 56/181 |
| 2015/0195993 A1* | 7/2015 | Hasenour | A01D 61/002 |
| | | | 56/153 |
| 2016/0345497 A1* | 12/2016 | Hasenour | A01D 57/20 |
| 2017/0094899 A1* | 4/2017 | Webermann | B65G 15/42 |
| 2018/0352743 A1* | 12/2018 | Hasenour | A01D 61/00 |
| 2019/0124843 A1* | 5/2019 | Augustine | A01D 57/20 |
| 2020/0359564 A1* | 11/2020 | Bell | A01D 61/008 |

OTHER PUBLICATIONS

International Search Report and Written Opinion dated Sep. 17, 2019 for PCT/US2019/029089, 13 pgs.

* cited by examiner

BELTING WITH LONGITUDINAL COGS

REFERENCE TO RELATED APPLICATION

This application claims priority to Provisional Applic. No. 62/672,846, filed on May 17, 2018, the contents of which are incorporated herein by reference.

FIELD OF THE INVENTION

The invention generally relates to belting. More particularly, the invention relates to belting with longitudinal cogs.

BACKGROUND OF THE INVENTION

Because of their ability to move large amounts of material, conveyor belts have been long used in industry. One area in which conveyor belts are extensively used is equipment for moving agricultural products and, in particular, agricultural equipment that is used for harvesting.

In certain agricultural equipment, objects are laterally loaded onto conveyors. There can be challenges associated with causing the objects to be accurately loaded onto the conveyors without spilling.

An example of one device that has been developed to address these issues is a crop header that is described in U.S. Pat. No. 7,472,533, which is assigned to MacDon Industries Ltd.

SUMMARY OF THE INVENTION

An embodiment of the invention is directed to belting with longitudinal cogs that includes belting and at least two longitudinal cogs. The belting has an upper surface, a lower surface and a first edge. The at least two longitudinal cogs are attached to the upper surface of the belting proximate the first edge. Each of the longitudinal cogs is substantially parallel to the first edge. A channel is defined between the at least two longitudinal cogs.

Another embodiment of the invention is directed to agricultural harvesting equipment including belting with longitudinal cogs and a draper seal. The belting with longitudinal cogs has belting and at least two longitudinal cogs. The belting has an upper surface, a lower surface and a first edge. The at least two longitudinal cogs are attached to the upper surface of the belting proximate the first edge. A channel is defined between the at least two longitudinal cogs. The draper seal has an end. The end of the draper seal at least partially extends into the channel.

Another embodiment of the invention is directed to a method of conveying product. Belting is provided with at least two longitudinal cogs attached to an upper surface thereof proximate a first edge thereof. A channel is defined between the at least two longitudinal cogs. An end of a draper seal extends into the channel. Product is moved over the draper seal and onto the belting. The belting moves with respect to a support structure. The product is prevented from falling off the first edge of the belting in a portion of the belting where the end of the draper seal is in the channel.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

An embodiment of the invention is directed to belting that is used in conjunction with a conveyor to move objects. In certain embodiments, the belting is used in conjunction with agricultural equipment that includes a draper seal. In other embodiments, the belting is used in conjunction with a header on a crop harvester.

Figure 1:
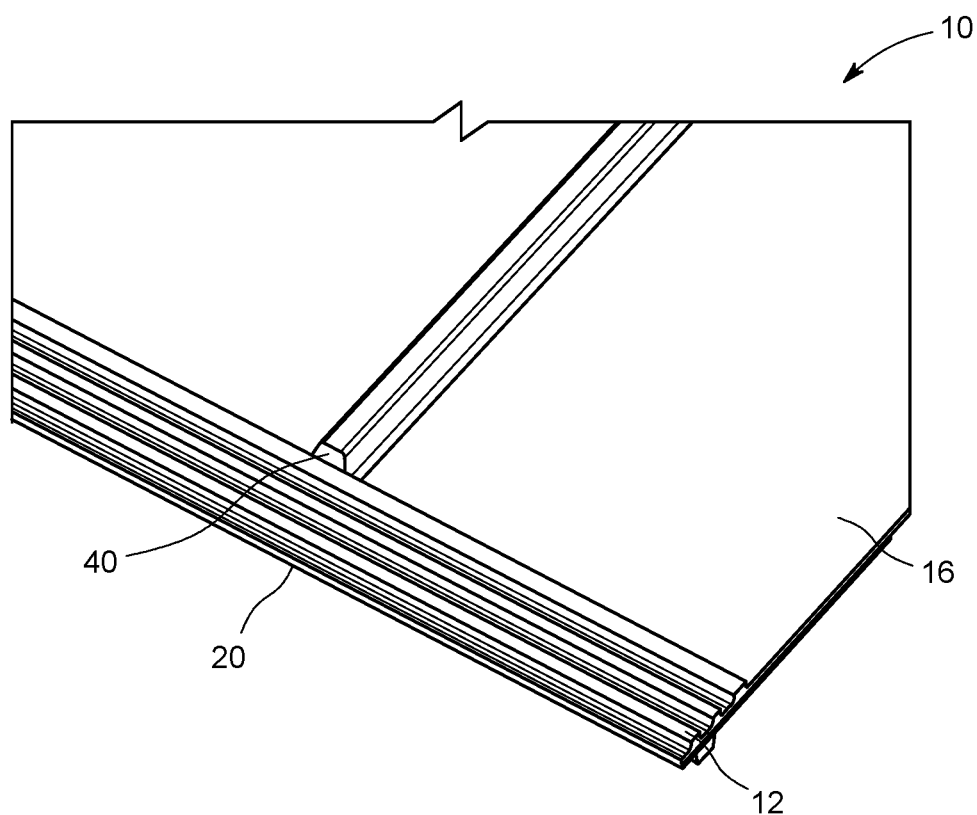
FIG. 1 is a perspective view of belting with longitudinal cogs according to an embodiment of the invention.
Figure 2:
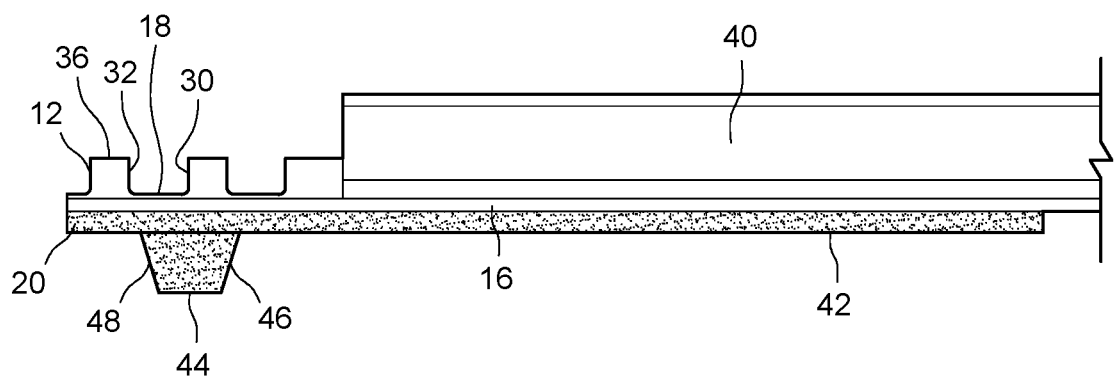
FIG. 2 is a side view of the belting in FIG. 1.

The belting 10 includes a first edge 20, as illustrated in FIGS. 1 and 2. While only the first edge 20 of the belting 10 is illustrated, the belting 10 also includes a second edge that is opposite the first edge 20. The structure of the belting 10 proximate the second edge may be similar to the structure of the belting 10 proximate the first edge 20.

The belting 10 is fabricated with a width based upon the conveyor in which the belting 10 is intended to be used. In certain embodiments, the belting 10 has a width of between about 24 inches and about 96 inches. In other embodiments, the belting 10 has a width of between about 36 inches and about 48 inches.

A person of skill in the art will appreciate that a variety of materials and processes may be used to fabricate the belting 10. Examples of suitable fabricating techniques include skim or friction coating at least one surface of a base 16 with a rubber material.

Proximate the first edge 20, a plurality of longitudinal cogs 12 are provided on an upper surface thereof. Each of the longitudinal cogs 12 is substantially parallel to the first edge 20. As used herein, substantially parallel means that an angle between each of the longitudinal cogs 12 and the first edge 20 is less than about 5 degrees. In other embodiments, the angle between the longitudinal cogs 12 and the first edge 20 is 0 degrees. In certain embodiments, there are at least two longitudinal cogs 12. In other embodiments, there are three or four longitudinal cogs 12.

In certain embodiments, each of the longitudinal cogs 12 has a substantially similar height. As used herein, substantially similar height means that a difference between the height of each of the longitudinal cogs 12 is less than about 10 percent of the height of the longitudinal cogs 12. In other embodiments, at least one of the longitudinal cogs 12 has a height that is different than the height of the other longitudinal cogs 12.

In certain embodiments, each of the longitudinal cogs 12 has a substantially similar width. As used herein, substantially similar width means that a difference between the width of each of the longitudinal cogs 12 is less than about 10 percent of the width of the longitudinal cogs 12.

In other embodiments, at least one of the longitudinal cogs 12 has a width that is different than the width of the other longitudinal cogs 12 such as the horizontal cog 10 that is furthest from the first edge 20. At least a portion of the longitudinal cogs 12 may have a height that is approximately equal to the width.

Each of the longitudinal cogs 12 includes an inner sidewall 30 and an outer sidewall 32, as most clearly illustrated in FIG. 2. As used herein, the inner sidewall 30 is oriented away from the first edge 20 and the outer sidewall 32 is oriented towards the first edge 20.

At least one of the inner sidewall 30 and the outer sidewall 32 may be oriented at an acute angle between an inner surface thereof and the base 16 so that a width of the longitudinal cog 12 proximate the belting 10 is greater than a width of the longitudinal cog 12 opposite the belting 10. In certain embodiment, the inner sidewall 30 and the outer sidewall 32 are oriented at an angle of up to about 15 degrees. In other embodiments, the inner sidewall 30 and the outer sidewall 32 are both oriented at an angle of between about 5 degrees and about 6 degrees.

Proximate the intersection of the inner sidewall 30 and the outer sidewall 32 with the base 16, there may be a curved surface 34. In certain embodiments, curvature is at a radius of between about 0.04 inches and about 0.05 inches.

Each of the longitudinal cogs 12 may include an upper cog surface 36 that extends between the inner sidewall 30 and the outer sidewall 32 at an end of the longitudinal cog 12 that is opposite the base 16. While it is illustrated that the upper cog surface 36 is substantially linear, it is possible for the upper cog surface 36 to have alternative configurations, examples of which include rounded and pointed.

In certain embodiments, the upper cog surface 36 is oriented substantially parallel to the upper surface of the base 16. As used herein, substantially parallel means that an angle between the upper cog surface 36 and the upper surface of the base 16 is less than about 10 degrees. In other embodiments, the angle between the upper cog surface 36 and the upper surface of the base 16 is between about 2 degrees and about 0 degrees.

The longitudinal cogs 12 are positioned in a spaced-apart relationship so that a channel 18 is defined between each of the adjacent longitudinal cogs 12. Similar to the embodiment illustrated in FIG. 4, the channel 18 should be sufficiently wide so that an end of a draper seal may be at least partially received in the channel 18. This configuration reduces the potential of objects being placed on the belting 10 from falling off the belting 10.

While it is illustrated that the width of the channels 18 is approximately equal, the width of the channels 18 can be varied utilizing the concepts of the invention. In certain embodiments, the width of the channels 18 is between about 60 percent and about 120 percent of a width of the longitudinal cogs 12.

Intermediate the longitudinal cogs 12 proximate the first side edge 20 and the second side edge (not shown) is a central region 22 of the belting 10. The central region 22 is a substantially flat part of the belting 10 on which objects being conveyed using the conveyor are placed. To increase the volume of object that may be conveyed with the conveyor and/or to reduce movement of the objects on the conveyor, the belting 10 may include at least one cleat 40 that extends from an upper surface thereof. The at least one cleat 40 extends across the width of the belting 10. Features of the at least one cleat 40 such as the height and spacing between adjacent cleats 40 are selected based upon factors that are known to persons of skill in the art such as the material that is being moved on the belting 10.

In certain embodiments, the cleats 40 have a height of up to about 2 inches. In other embodiments, the cleats 40 have a height of about 0.5 inches. In certain embodiments, a spacing between adjacent cleats 40 is between about 4 inches and about 24 inches. In other embodiments, the spacing between adjacent cleats 40 is about 12 inches.

A reinforcing panel 42 may be provided on the lower surface of the belting 10 proximate the first edge 20. The reinforcing panel 42 may decrease degradation of the lower surface of the belting 10 caused by the movement of the belting 10 over the belting support structure (not shown).

In certain embodiments, the reinforcing panel 42 has a width of between about 3 inches and about 12 inches. In other embodiments, the reinforcing panel 42 has a width of between about 5 inches and about 6 inches.

A person of skill in the art will appreciate that the reinforcing panel 42 may be fabricated from a variety of materials using the concepts of the invention. A person of skill in the art will appreciate that there are a variety of techniques for attaching the reinforcing panel 42 to the belting 10 such as during the vulcanizing process.

Proximate the first edge 20, a guide rib 44 extends from the lower surface of the belting 10. The guide rib 44 at least partially seats in a recess (not shown) on the belting support structure. The guide rib 44 assists in maintaining the belting 10 in alignment with respect to the belting support structure.

The guide rib 44 may be selected with a height and a width based upon factors such as the width and the length of the belting 10. In certain embodiments, the height of the guide rib 44 is between about 0.2 inches and about 0.4 inches. In certain embodiments, the width of the guide rib 44 is between about 0.2 inches and 0.6 inches.

In certain embodiments, the guide rib 44 includes an inner sidewall 46 and an outer sidewall 48. At least one of the inner sidewall 46 and the outer sidewall 48 may be oriented at an acute angle between an inner surface thereof and the base 16 so that a width of the guide rib 44 proximate the belting 10 is greater than a width of the guide rib 44 opposite the belting 10. In certain embodiment, the width of the guide rib 44 opposite the belting 10 is between about 50 percent and about 70 percent of the width of the guide rib 44 proximate the belting 10.

Figure 3:
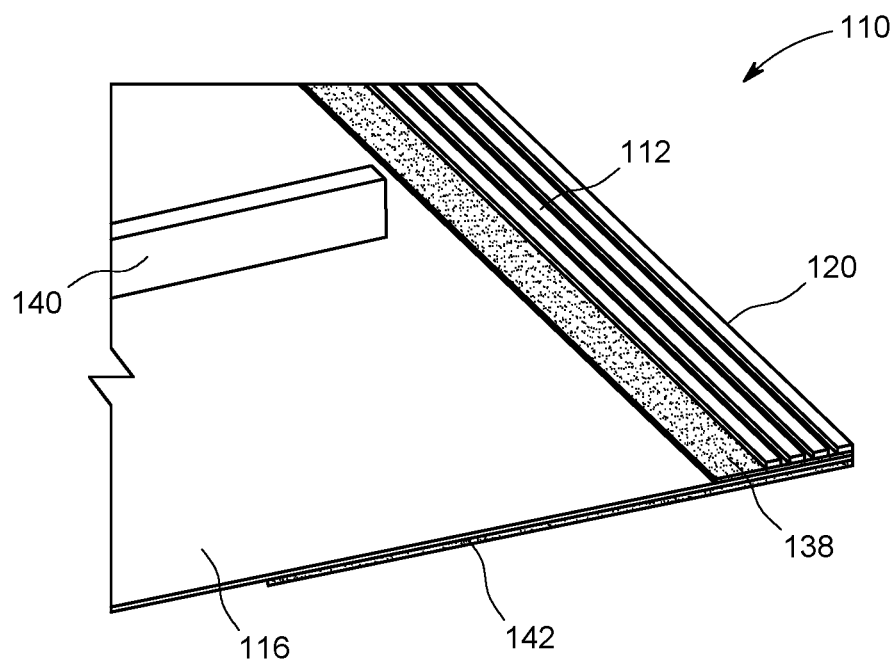
FIG. 3 is a perspective view of another embodiment of the belting.
Figure 4:
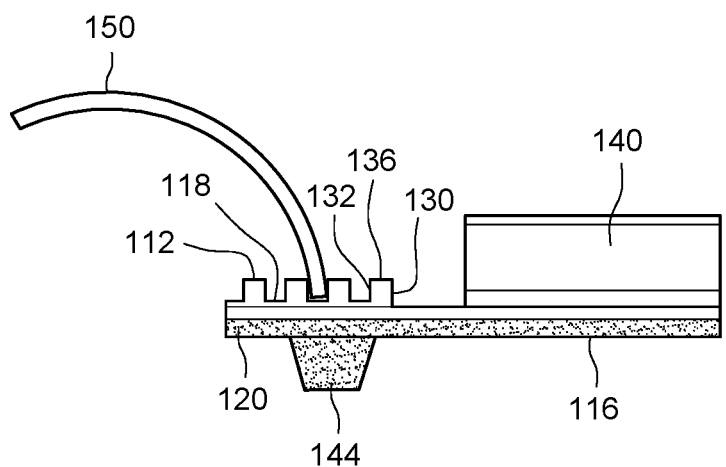
FIG. 4 is a side view of a draper seal used in conjunction with the belting of FIG. 3.

An alternative embodiment of the belting 110 is illustrated in FIGS. 3 and 4. A primary difference between the belting 10 illustrated in FIGS. 1 and 2 and the belting 110 illustrated in FIGS. 3 and 4 is that there are four longitudinal cogs 12 extending from the belting 110 in FIGS. 3 and 4.

The features of this embodiment are similar to the features of the belting 10 described with respect to FIGS. 1 and 2. The belting 110 includes a first edge 120. While only the first edge 120 of the belting 110 is illustrated, the belting 10 also includes a second edge that is opposite the first edge 120. The structure of the belting 110 proximate the second edge may be similar to the structure of the belting 110 proximate the first edge 120.

The belting 10 is fabricated with a width based upon the conveyor in which the belting 10 is intended to be used. In certain embodiments, the belting 10 has a width of between about 24 inches and about 96 inches. In other embodiments, the belting 10 has a width of between about 36 inches and about 48 inches.

A person of skill in the art will appreciate that a variety of materials and processes may be used to fabricate the belting 110. Examples of suitable fabricating techniques include skim or friction coating at least one surface of a base 116 with a rubber material.

Proximate the first edge 120, a plurality of longitudinal cogs 112 are provided on an upper surface thereof. In certain embodiments, there are at least two longitudinal cogs 112. In other embodiments, there are three or four longitudinal cogs 112.

In certain embodiments, each of the longitudinal cogs 112 has a substantially similar height. As used herein, substantially similar height means that a difference between the height of each of the longitudinal cogs 112 is less than about 10 percent of the height of the longitudinal cogs 112. In other embodiments, at least one of the longitudinal cogs 112 has a height that is different than the height of the other longitudinal cogs 112.

In certain embodiments, each of the longitudinal cogs 112 has a substantially similar width. As used herein, substantially similar width means that a difference between the width of each of the longitudinal cogs 112 is less than about 10 percent of the width of the longitudinal cogs 112. In other embodiments, at least one of the longitudinal cogs 112 has a width that is different than the width of the other longitudinal cogs 112. At least a portion of the longitudinal cogs 112 may have a height that is approximately equal to the width.

Each of the longitudinal cogs 112 includes an inner sidewall 130 and an outer sidewall 132, as most clearly illustrated in FIG. 4. As used herein, the inner sidewall 130 is oriented away from the first edge 120 and the outer sidewall 132 is oriented towards the first edge 120.

While not illustrated and similar to the embodiment illustrated in FIG. 2, at least one of the inner sidewall 130 and the outer sidewall 132 may be oriented at an acute angle between an inner surface thereof and the base 116 so that a width of the longitudinal cog 112 proximate the belting 110 is greater than a width of the longitudinal cog 112 opposite the belting 110. In certain embodiment, the inner sidewall 130 and the outer sidewall 132 are oriented at an angle of up to about 15 degrees. In other embodiments, the inner sidewall 130 and the outer sidewall 132 are both oriented at an angle of between about 5 degrees and about 6 degrees.

Proximate the intersection of the inner sidewall 130 and the outer sidewall 132 with the base 116, there may be a curved surface that is similar to the structure illustrated in FIG. 2. In certain embodiments, curvature is at a radius of between about 0.04 inches and about 0.05 inches.

Each of the longitudinal cogs 112 may include an upper cog surface 136 that extends between the inner sidewall 130 and the outer sidewall 132 at an end of the longitudinal cog 112 that is opposite the base 116. While it is illustrated that the upper cog surface 136 is substantially linear, it is possible for the upper cog surface 136 to have alternative configurations, examples of which include rounded and pointed.

In certain embodiments, the upper cog surface 136 is oriented substantially parallel to the upper surface of the base 116. As used herein, substantially parallel means that an angle between the upper cog surface 136 and the upper surface of the base 116 is less than about 10 degrees. In other embodiments, the angle between the upper cog surface 136 and the upper surface of the base 116 is between about 2 degrees and about 0 degrees.

The longitudinal cogs 112 are positioned in a spaced-apart relationship to define a channel 118. The channel 118 should be sufficiently wide so that an end of a draper seal 150 may be at least partially received in the channel 118, as illustrated in FIG. 4. This configuration reduces the potential of objects being placed on the belting 110 from falling off the belting 110.

While it is illustrated that the widths of the channels 118 is approximately equal, the widths of the channels 118 can be varied utilizing the concepts of the invention. In certain embodiments, the width of the channels 118 is between about 60 percent and about 120 percent of a width of the longitudinal cogs 112.

As an alternative to directly attaching the longitudinal cogs 112 to the base 116, it is possible for the longitudinal cogs 112 to be attached to a cog support 138 that is then attached to the base 116. In certain embodiments, the cog support 138 has a width that is larger than the overall width of the longitudinal cogs 112. The cog support 138 may facilitate forming the longitudinal cogs 112 as a unit which is then attached to the base 116. The cog support 138 may thereby enhance the ability to accurately attach the longitudinal cogs 112 to the base 116. The cog support 138 may also enhance the adherence of the longitudinal cogs 112 to the base 116.

Intermediate the longitudinal cogs 112 proximate the first side edge 120 and the second side edge (not shown) is a central region 122 of the belting 10. The central region 122 is a substantially flat part of the belting 110 on which objects being conveyed using the conveyor are placed. To increase the volume of objects that may be conveyed with the conveyor and/or to reduce movement of the objects on the conveyor, the belting 110 may include at least one cleat 140 that extends from an upper surface thereof. The at least one cleat 140 extends across a width of the belting 110. Features of the at least one cleat 140 such as the height and spacing between adjacent cleats 140 are selected based upon factors that are known to persons of skill in the art such as the material that is being moved on the belting 110.

In certain embodiments, the cleats 140 have a height of up to about 2 inches. In other embodiments, the cleats 140 have a height of about 0.5 inches. In certain embodiments, a spacing between adjacent cleats 140 is between about 4 inches and about 24 inches. In other embodiments, the spacing between adjacent cleats 140 is about 12 inches.

A reinforcing panel 142 may be provided on the lower surface of the belting 110 proximate the first edge 120. The reinforcing panel 142 may decrease degradation of the lower surface of the belting 110 caused by the movement of the belting over the belting support structure (not shown).

In certain embodiments, the reinforcing panel 142 has a width of between about 3 inches and about 12 inches. In other embodiments, the reinforcing panel 142 has a width of between about 5 inches and about 6 inches.

A person of skill in the art will appreciate that the reinforcing panel 142 may be fabricated from a variety of materials using the concepts of the invention. A person of skill in the art will appreciate that there are a variety of techniques for attaching the reinforcing panel 142 to the belting 110 such as during the vulcanizing process.

Proximate the first edge 120, a guide rib 144 extends from the lower surface of the belting 110. The guide rib 144 at least partially seats in a recess (not shown) on the belting support structure. The guide rib 144 assists in maintaining the belting 110 in alignment with respect to the belting support structure.

The guide rib 144 may be selected with a height and a width based upon factors such as the width and the length of the belting 110. In certain embodiments, the height of the guide rib 144 is between about 0.2 inches and about 0.4 inches. In certain embodiments, the width of the guide rib 144 is between about 0.2 inches and 0.6 inches.

In certain embodiments, the guide rib 144 includes an inner sidewall 146 and an outer sidewall 148. At least one of the inner sidewall 146 and the outer sidewall 148 may be oriented at an acute angle between an inner surface thereof and the base 116 so that a width of the guide rib 144 proximate the belting 110 is greater than a width of the guide rib 144 opposite the belting 110. In certain embodiment, the width of the guide rib 144 opposite the belting 110 is between about 50 percent and about 70 percent of the width of the guide rib 144 proximate the belting 110.

In use, product flows over the draper seal 150 and onto the belting 110 as indicated by arrow 152. The belting moves with respect to the support structure to convey the product. Because the end of the draper seal 150 extends into the channel 118, the product is prevented from falling off the first edge 120 of the belting 110 in a portion of the belting where the end of the draper seal is in the channel. In contrast, product falls off the first edge 120 of the belting even if the end of the draper seal 150 was maintained proximate the upper surface of the belting 110.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. Belting with longitudinal cogs comprising:
    belting having an upper surface, a lower surface and a first edge;
    at least two longitudinal cogs attached to the upper surface of the belting proximate the first edge, wherein each of the longitudinal cogs is substantially parallel to the first edge and wherein a channel is defined between the at least two longitudinal cogs; and
    a cleat attached to the upper surface of the belting that extends across a width of the belting.

2. The belting with longitudinal cogs of claim 1, wherein the channel is adapted to receive an end of a draper seal.

3. The belting with longitudinal cogs of claim 1, wherein the channel has a width that is between about 60 percent and 120 percent of a width of each of the longitudinal cogs.

4. The belting with longitudinal cogs of claim 1, wherein each of the longitudinal cogs is wider proximate the belting.

5. The belting with longitudinal cogs of claim 1, wherein each of the longitudinal cogs comprises an inner sidewall and an outer sidewall, wherein the inner sidewall is oriented away from the first edge, wherein the outer sidewall is oriented towards the first edge, wherein the outer sidewall is oriented at an acute angle between an inner surface thereof and the belting and wherein the inner sidewall is oriented at an acute angle between an inner surface thereof and the belting.

6. The belting with longitudinal cogs of claim 1, and further comprising a cog support to which each of the at least two longitudinal cogs is attached and wherein the cog support is attached to the belting proximate the first edge.

7. The belting with longitudinal cogs of claim 1, and further comprising a guide rib attached to and extending from the lower surface of the belting proximate the first edge.

8. The belting with longitudinal cogs of claim 1, and further comprising a reinforcing panel attached to the lower surface of the belting proximate the first edge.

9. The belting with longitudinal cogs of claim 1, wherein the at least one cleat is oriented substantially perpendicular to the first edge.

10. Agricultural harvesting equipment comprising:
    belting with longitudinal cogs comprising:
        belting having an upper surface, a lower surface and a first edge;
        at least two longitudinal cogs attached to the upper surface of the belting proximate the first edge, wherein each of the longitudinal cogs is substantially parallel to the first edge and wherein a channel is defined between the at least two longitudinal cogs; and
        a cleat attached to the upper surface of the belting that extends across a width of the belting; and
    a draper seal having an end, wherein the end of the draper seal at least partially extends into the channel.

11. The agricultural harvesting equipment of claim 10, wherein the channel has a width that is between about 60 percent and 120 percent of a width of each of the longitudinal cogs.

12. The agricultural harvesting equipment of claim 10, wherein each of the longitudinal cogs comprises an inner sidewall and an outer sidewall, wherein the inner sidewall is oriented away from the first edge, wherein the outer sidewall is oriented towards the first edge, wherein the inner sidewall is oriented at an acute angle between an inner surface thereof and the belting and wherein the outer sidewall is oriented at an acute angle between an inner surface thereof and the belting.

13. The agricultural harvesting equipment of claim 10, and further comprising a cog support to which each of the at least two longitudinal cogs is attached and wherein the cog support is attached to the belting proximate the first edge.

14. The agricultural harvesting equipment of claim 10, and further comprising a guide rib attached to and extending from the lower surface of the belting proximate the first edge.

15. The agricultural harvesting equipment of claim 10, and further comprising a reinforcing panel attached to the lower surface of the belting proximate the first edge.

16. A method of conveying product comprising:
    providing belting with at least two longitudinal cogs attached to an upper surface thereof proximate a first edge thereof, wherein each of the longitudinal cogs is substantially parallel to the first edge and wherein a channel is defined between the at least two longitudinal cogs;
    extending an end of a draper seal into the channel;
    moving product over the draper seal and onto the belting; and
    moving the belting, wherein the product is prevented from falling off the first edge of the belting in a portion of the belting where the end of the draper seal is in the channel.

17. The method of claim 16, wherein the channel has a width that is between about 60 percent and 120 percent of a width of each of the longitudinal cogs.

18. The method of claim 16, wherein each of the longitudinal cogs comprises an inner sidewall and an outer sidewall, wherein the inner sidewall is oriented away from the first edge, wherein the outer sidewall is oriented towards the first edge, wherein the inner sidewall is oriented at an acute angle between an inner surface thereof and the belting and wherein the outer sidewall is oriented at an acute angle between an inner surface thereof and the belting.

19. The method of claim 16, and further comprising attaching the at least two longitudinal cogs to a cog support and attaching the cog support to the belting proximate the first edge.

20. The method of claim 16, wherein the belting further comprises a guide rib attached to and extending from the lower surface of the belting proximate the first edge.

21. Belting for conveying objects comprising:
belting having an upper surface, a lower surface, a first edge and a second edge that is opposite the first edge;
two first longitudinal cogs attached to the upper surface of the belting proximate the first edge, wherein each of the two first longitudinal cogs is substantially parallel to the first edge and wherein a first channel is defined between the two first longitudinal cogs;
two second longitudinal cogs attached to the upper surface of the belting proximate the second edge, wherein each of the two second longitudinal cogs is substantially parallel to the second edge, wherein a second channel is defined between the two second longitudinal cogs and wherein intermediate the two first longitudinal cogs and the two second longitudinal cogs is a central region; and
at least one cleat attached to the belting, wherein the at least one cleat extends between the two first longitudinal cogs and the two second longitudinal cogs.

22. The belting with longitudinal cogs of claim 21, wherein the central region is substantially flat.

23. The belting with longitudinal cogs of claim 21, wherein the two first longitudinal cogs, the first channel, the two second longitudinal cogs and the second channel collectively constitute no more than 50 percent of a width of the belting.

24. The belting with longitudinal cogs of claim 21, wherein the channel is adapted to receive an end of a draper seal.

25. The belting with longitudinal cogs of claim 21, wherein the channel has a width that is between about 60 percent and 120 percent of a width of each of the longitudinal cogs.

26. The belting with longitudinal cogs of claim 21, and further comprising a cog support to which each of the at least two longitudinal cogs is attached and wherein the cog support is attached to the belting proximate the first edge.

* * * * *